US010059259B2

(12) United States Patent
Cannon et al.

(10) Patent No.: US 10,059,259 B2
(45) Date of Patent: Aug. 28, 2018

(54) LIGHT-EMITTING INTERIOR TRIM COMPONENT FOR A MOTOR VEHICLE

(71) Applicant: International Automotive Components Group GmbH, Krefeld (DE)

(72) Inventors: Carter Scott Cannon, München (DE); Michael Behnke, Vaterstetten (DE)

(73) Assignee: International Automotive Components Group GmbH (DE)

( * ) Notice: Subject to any disclaimer, the term of this patent is extended or adjusted under 35 U.S.C. 154(b) by 0 days.

(21) Appl. No.: 14/168,814

(22) Filed: Jan. 30, 2014

(65) Prior Publication Data
US 2014/0211498 A1 Jul. 31, 2014

(30) Foreign Application Priority Data

Jan. 30, 2013 (DE) .......... 10 2013 100 941

(51) Int. Cl.
*B60Q 3/54* (2017.01)
*B60Q 3/62* (2017.01)
*B60Q 3/64* (2017.01)
*B60Q 3/20* (2017.01)
*B60Q 3/217* (2017.01)
*B60Q 3/233* (2017.01)
*B60Q 3/74* (2017.01)
(Continued)

(52) U.S. Cl.
CPC .................. *B60Q 3/54* (2017.02); *B60Q 3/14* (2017.02); *B60Q 3/20* (2017.02); *B60Q 3/217* (2017.02); *B60Q 3/233* (2017.02); *B60Q 3/62* (2017.02); *B60Q 3/64* (2017.02); *B60Q 3/745* (2017.02); *B60Q 3/76* (2017.02); *B60Q 2500/10* (2013.01); *Y10T 29/49826* (2015.01)

(58) Field of Classification Search
CPC ........ B60Q 3/00; B60Q 3/0216; B60Q 3/002; B60Q 3/044; B60Q 3/0055; B60Q 3/04; B60Q 2500/10
See application file for complete search history.

(56) References Cited

U.S. PATENT DOCUMENTS 4,576,855 A * 3/1986 Okina ................. C08G 18/10
428/215
6,464,381 B2 * 10/2002 Anderson, Jr. ...... B60Q 3/0283
362/153
(Continued)

FOREIGN PATENT DOCUMENTS

DE 102005052534 * 5/2007 .......... B60Q 3/0216
DE 10 2006 012 606 A1 11/2007
(Continued)

OTHER PUBLICATIONS

Written Opinion of the International Searching Authority issued in WO2016059225, dated Apr. 15, 2016 (9 pgs).

*Primary Examiner* — Robert May
(74) *Attorney, Agent, or Firm* — Grossman, Tucker, Perreault & Pfleger, PLLC

(57) ABSTRACT

The invention relates to an interior trim component for a motor vehicle, which comprises: a carrier component, which determines the contour of the interior trim component, a cover layer, which is applied to a front side of the carrier component, and a light-emitting layer, which is applied to a back side of the carrier component, wherein the carrier component and the cover layer are transparent.

25 Claims, 12 Drawing Sheets

(51) Int. Cl.
*B60Q 3/76* (2017.01)
*B60Q 3/14* (2017.01)

(56) References Cited

U.S. PATENT DOCUMENTS

| | | | |
|---|---|---|---|
| 7,017,968 B1* | 3/2006 | Radu | B29C 45/14778 131/231 |
| 7,237,933 B2* | 7/2007 | Radu et al. | 362/488 |
| 7,364,315 B2* | 4/2008 | Chien | A41D 27/085 362/103 |
| 7,534,017 B2* | 5/2009 | Barowski | B60Q 1/302 362/488 |
| 7,798,548 B2* | 9/2010 | Embach | B32B 5/08 296/1.08 |
| RE42,340 E | 5/2011 | Anderson et al. | |
| 8,016,465 B2 | 9/2011 | Egerer et al. | |
| 8,256,945 B2* | 9/2012 | Choquet | 362/551 |
| 8,449,161 B2* | 5/2013 | Igoe et al. | 362/558 |
| 8,506,141 B2* | 8/2013 | Cannon | B60Q 3/004 362/490 |
| 8,662,722 B2* | 3/2014 | Dixon | 362/488 |
| 2012/0051067 A1* | 3/2012 | Murray | 362/311.02 |
| 2012/0314438 A1* | 12/2012 | Gutt | B60Q 3/0233 362/511 |

FOREIGN PATENT DOCUMENTS

| | | |
|---|---|---|
| DE | 20 2010 005 688 U1 | 10/2011 |
| DE | 10 2010 036 795 A1 | 2/2012 |
| DE | 10 2011 016 417 A1 | 10/2012 |
| DE | 10 2012 111 187 A1 | 5/2014 |
| EP | 2 060 444 A1 | 11/2007 |
| EP | 2 072 332 A1 | 12/2008 |
| EP | 2 228 258 A2 | 12/2009 |
| EP | 2 233 366 A1 | 9/2010 |
| EP | 2732965 A1 | 5/2014 |
| FR | 2 747 971 A1 | 10/1997 |
| FR | 2 875 580 A1 | 3/2006 |
| FR | 2 877 896 A1 | 5/2006 |
| FR | 2 937 929 A1 | 5/2010 |
| GB | 2489813 A | 10/2012 |
| WO | 2016059225 A2 | 4/2016 |

* cited by examiner

LIGHT-EMITTING INTERIOR TRIM COMPONENT FOR A MOTOR VEHICLE

The invention relates to an interior trim component for a motor vehicle, which can provide illumination for the passenger compartment of the motor vehicle.

Interior lighting systems for motor vehicles serve either generally for area lighting or for background lighting, or are used for illuminating individual objects for aesthetic or functional purposes. In the past, incandescent bulbs have generally been used for interior lighting, both for area lighting and for illuminating individual objects. Increasingly, LEDs are also being used for lighting. It is further known to integrate lighting systems into interior trim components, in which case various limitations must be taken into consideration, such as the heat that is generated by the lighting systems, the susceptibility of the lighting systems to damage, and the need to house the lighting systems such that they are unobtrusive and well integrated into the interior trim components.

EP 2 228 258 A2 of the applicant describes integrating LEDs and the associated control electronics into interior trim components. A relatively thin printed LED background lighting component with an integrated diffuser is integrated into an interior trim component in a molding process. The actual light source for the LED background lighting component is concealed behind a woven fabric surface or a grate, or directly forms the outer surface of the interior trim component, providing lighting. A similar configuration is known from DE 10 2010 036 795 A1.

U.S. RE 42 340 E describes an interior lighting system for a motor vehicle, which uses electroluminescent plates arranged between a carrier substrate and a cover layer, wherein the cover layer is transparent. Recesses for accommodating the electroluminescent plate can be provided in the carrier substrate or the cover layer, so that said plate does not show through the material of the cover layer and is not visible from the outside.

EP 2 233 366 A1 describes an interior trim component having a backlit decorative layer, wherein a light-conducting layer is arranged between carrier substrate and decorative layer.

With known lighting systems of this type, which are integrated into the interior trim of a motor vehicle, the light-conducting and light-emitting layer is always located between the carrier substrate, which determines the shape of the interior trim, and a single-layer or multilayer cover layer. Because the light-emitting layer is embedded between carrier substrate and cover layer, the light-emitting layer is substantially imperceptible when the system is switched off, and said layer is protected between cover layer and carrier substrate. However, the lighting systems of the prior art also have a number of disadvantages.

To connect the light-emitting layer to a dedicated electronic control system and/or to light sources, and/or to supply said layer with power, connections for the light-emitting layer must be integrated into the carrier substrate or routed onto the back side of the carrier substrate. DE 10 2010 036 795 A1 relates to this.

Particularly if the light-emitting layer covers a larger area of the carrier substrate and is thereby routed over edges, corners or similar protrusions on the carrier substrate and is curved at these points, hot spots can form at said points, resulting in a generation of excess heat, which can damage the material of the light-emitting layer or adjacent components. At these points, the amount of light that is emitted can also be increased, so that it is difficult, especially in the case of more heavily curved interior trim components, to achieve uniform surface illumination.

Furthermore, light-emitting layers which are formed, for example, from luminescent plates, light-conducting films, transparent or translucent textiles or non-woven fabrics, LED films or the like are generally highly susceptible to damage resulting from mechanical factors, such as shocks, impacts or puncturing with sharp objects, or from liquids and chemicals. The cover layer applied over the light-emitting layer therefore cannot provide adequate protection to the lighting system under all circumstances.

One problem addressed by the invention is that of specifying an interior trim component for a motor vehicle which will overcome the above-stated disadvantages. In particular, a more uniform distribution of lighting over the surface of the interior trim component should also be achieved, even in the case of more heavily contoured interior trim components.

This problem is solved by an interior trim component having the features of claim 1 and a method according to claim 12. Embodiments of the invention are specified in the dependent claims.

The interior trim component according to the invention comprises a carrier component which determines the contour of the interior trim component, a cover layer which is applied to a visible side of the carrier component, and a light-emitting layer, which is applied to a back side of the carrier component. The carrier component and the cover layer are transparent, partially transparent, or translucent, or in other words, they allow light to pass through in some manner. The sequence of different layers that form the illuminated interior trim component is therefore modified over that of the prior art.

By positioning the light-emitting layer on the back side of the carrier component, a plurality of problems can be solved and numerous advantages can be achieved. Since it is not necessary with this configuration to route the connections for the light-emitting layer or a connector end of the light-emitting layer itself from the visible side of the carrier component to the back side thereof in order to connect the light-emitting layer to a light source and/or power source and/or control system, not only can openings in the carrier component be dispensed with, a bending of the light-emitting layer around the outer edge of the carrier component or along the edge of a corresponding opening can also be avoided.

If the light-emitting layer is positioned on the back side of the carrier component, it also does not need to precisely reflect the contour of the carrier component, and can instead cover raised areas, edges, ribs, etc. relatively loosely. Therefore, the light-emitting layer is not curved or is only slightly curved, and the contour of the carrier component exerts no pressure on the light-emitting layer. As a result, the formation of hot spots can be avoided, and the emission of light will be largely uniform.

In addition, the transparent carrier component can serve as a diffuser, resulting in a particularly uniform emission of light and an imperceptibility of deviations in light intensity in the region of beading, ribs or the like.

By positioning the light-emitting layer on the back side of the carrier component, said layer is even better protected against external factors, impacts, punctures, soiling, chemicals, liquids, etc. than if the cover layer is applied as described in the prior art.

The process for producing the interior trim component, particularly molding the carrier component and laminating the cover layer thereto, can be carried out by means of routine production methods, without having to allow for the effects of temperature and pressure on a sensitive light-emitting layer in the design, for example. In a final process step, the light-emitting layer can be applied to the back side of the carrier component following completion of the carrier component and cover layer composite. The generally sensitive and costly light-emitting layer can thereby be protected. The light-emitting layer can be tested prior to assembly, thereby avoiding waste.

The change in the sequence of the individual layers of the interior trim component may at first appear to be a simple solution; however, it is not obvious to a person skilled in the art. It should be taken into consideration that a person skilled in the art designing an interior trim component will always begin with the carrier component or carrier substrate and will then design additional functional and decorative layers to be applied successively to the A-side of the carrier component. In the prior art, a light-emitting layer which serves to illuminate the visible side of the carrier component is always positioned on the visible side of the carrier. Positioning said layer on the back side of the carrier component is not obvious and also was not considered by the inventor for a long time during development of the interior trim component; the carrier component is generally designed with an eye to its support function, with those functional units that are to be hidden from the passengers of a vehicle being positioned on the back side of the carrier component, and those that provide the visual appearance thereof being positioned on the front side thereof. The invention represents a departure from this principle.

In one embodiment, the cover layer is permanently attached to the carrier component, for example, laminated thereto, and the light-emitting layer is removably attached to the carrier component, for example, via a latch-, snap- or screw connection. This also allows the light-emitting layer to be maintained or optionally replaced if a defect or damage is detected, even after the interior trim component has been produced.

The light-emitting layer can be applied to a base layer, thereby stabilizing the light-emitting layer and protecting it against external factors—acting on the back side of the interior trim. The base layer can also be used to fasten the light-emitting layer on the back side of the carrier component.

In one embodiment, the base layer is opaque in order to prevent the light-emitting layer on the back side of the carrier component from radiating light, which would then exit in an uncontrolled fashion in the area surrounding the interior trim component, for example at seams, gaps or the like, when the interior trim component is installed. In another embodiment, it is also possible for the light-emitting layer itself to be opaque on its back side, for example, by applying a suitable coating or by integrating a shielding into the layer.

Examples of the light-emitting layer include a woven fabric containing optical fibers, a light-conducting film or plate, an electroluminescent film, and an LED assembly, which is applied to a conducting or optical film or is integrated therein. Even more specific examples include a fabric made of light-conducting PMMA (polymethyl methacrylate) fibers, extruded PMMA in plate form, extruded glass fibers in plate form, a light-conducting plate, for example, made of PMMA, PU (polyurethane) or PC (polycarbonate), with lateral light infeed, an electroluminescent film, and a film or a foil with integrated or printed LEDs, wherein the foil can be electrically conducting and/or light-conducting and wherein organic LEDs (OLEDs) can also be used. The invention is not limited to any of the above-stated light-emitting layers, and a woven fabric containing PMMA fibers is preferably used.

In one embodiment, the light-emitting layer is a woven fabric containing optical fibers, and the woven fabric is opened up in the region of an opening in the interior trim component such that the optical fibers are routed around the opening without interrupting light conduction.

Examples of materials used for the carrier component include, but are not limited to, ABS (acrylonitrile butadiene), PC (polycarbonate), PC-ABS, PMMA, PU, PET (polyethylene terephthalate), for example, as a glass sandwich construction, etc. The carrier component is transparent and can be made of colored or uncolored plastic. The carrier component is the supporting structure of the interior trim component, and is rigid or semi-rigid and can be embodied as self-supporting and/or with an additional supporting structure. The outer contour of the interior trim component is determined by the carrier component and is reflected by the cover layer.

The carrier component is preferably configured such that it serves as a diffusing element for the light that is emitted by the light-emitting layer. An extremely uniform emission of light on the visible side of the interior trim component can thereby be achieved, in which no brighter or darker surface areas are produced, even in the region of beading, ribs, openings, edges, corners, etc.

The cover layer is likewise transparent, wherein the transparency of the cover layer can also be achieved by perforation and/or as a result of the material that is used. For example, the cover layer can be produced as a plastic layer made of TPU (thermoplastic polyurethane), TPO (thermoplastic elastomer with an olefin base), PVC (polyvinyl chloride), PU, or the like, wherein the cover layer can be shaped as a cutout from a roll or sheet of material, produced in a mold by injection molding, foaming or the like, formed as a slush skin, or produced in some other known manner. It is also possible for the cover layer to be a foamed-in decorative layer. It is further possible for the cover layer to be made of a perforated leather, synthetic leather, Alcantara or the like, which may also be foamed-in. In other embodiments, the cover layer may be produced from a knitted, woven, machine-knit, flocked or similar textile material, which can in turn be optionally foamed-in. The cover layer can itself have a structure or a pattern, and can have a single color or multiple colors, without limiting the invention to any of the above-stated embodiments.

In one embodiment, a reflector layer which intensifies the emission of light can be provided in addition to the light-emitting layer. As an alternative, the light-emitting layer can be embodied as a reflector layer, or a reflector layer can be integrated into the light-emitting layer.

The optional base layer for the light-emitting layer, similarly to the carrier component, can be made of plastic, for example, of ABS, PC-ABS or PC. Examples of methods for producing carrier components and a base layer include injection molding, vacuum molding, back molding, compression molding, casting and 3-D printing. However, the carrier layer can also be made of another opaque material, such as a punched metal sheet, cardboard, paper, a fiberboard, or a film, including adhesive film.

The interior trim component can be embodied as an insert for the interior trim of a motor vehicle or as an entire interior trim component, and can be installed, for example, in the trim on the interior side of a door, an instrument panel, a center console, a column, a roof liner, a seat, an armrest, a storage compartment or a covering thereof, a floor threshold or the like.

In what follows, the invention will be specified in greater detail in reference to the set of drawings. In the drawings.

Figure 1:
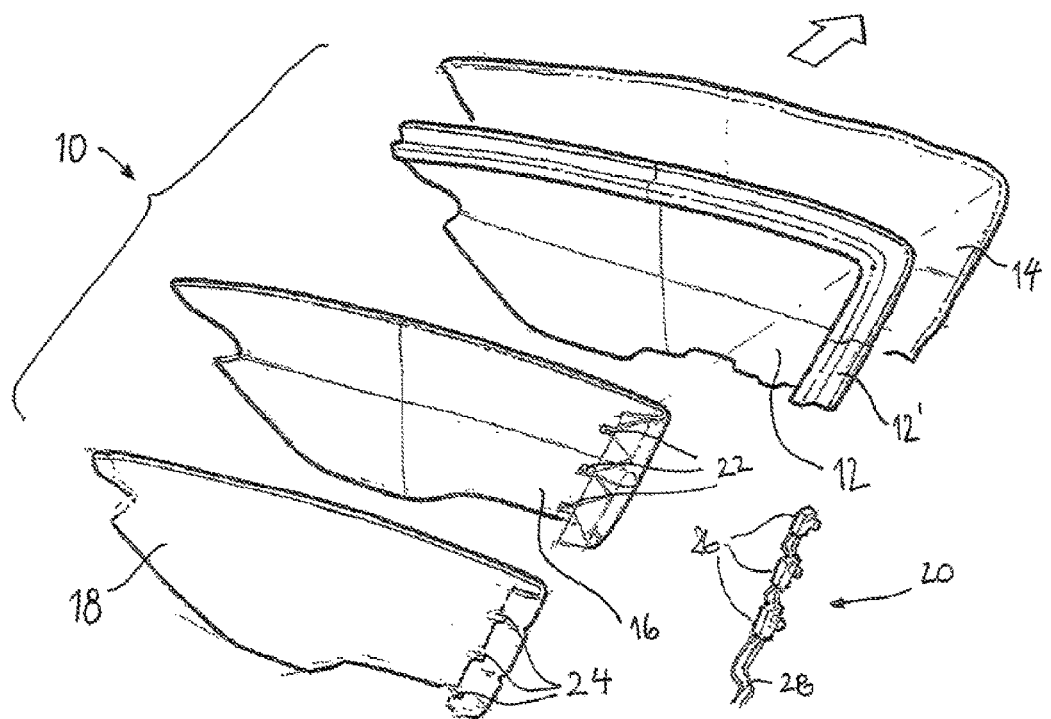
FIG. 1 shows a perspective, exploded view of an interior trim component according to one embodiment example.

FIG. 1 shows a perspective, exploded view of an interior trim component 10, wherein in the exemplary embodiment shown, the interior trim component 10 forms an insert for a door trim panel. The interior trim component 10 comprises a carrier component 12, a cover layer 14, a light-emitting layer 16 and a base layer 18, and a control module 20 for the light-emitting layer 16.

The carrier component 12 is made of a clear, transparent or translucent plastic, which can be white or colored, or can even have sections of different colors. In the exemplary embodiment shown in FIG. 1, the carrier component 12 has a curved edge 12' with a reinforcement bead and an outer contour that is adapted to match the shape of the door trim panel. The carrier component 12 could also have one or more openings, beads, ribs, and/or other structures and attachments; however these are not shown separately here.

Examples of materials for the carrier component 12 are listed above, wherein in practice these materials must meet all the criteria in terms of resistance to breakage, weight requirements, etc. that are required by the automobile industry. For the purposes of the invention, one important property of the carrier component is its transparency or translucency, wherein the carrier should preferably have transparency ranging from nearly 100% to approximately 30%. The invention is not limited to a particular degree of transparency.

In the variant shown, the cover layer 14 is matched as a blank cutout to the front side, also referred to as the visible side or A-side, of the carrier component 12, and is laminated, glued or attached by some other suitable method to the carrier component 12 on the front side of said carrier component 12. The cover layer 14 can be made of any of the above-described materials and can optionally be foamed-in. It can be transparent, semitransparent or translucent, colored or uncolored. It can also be perforated, and may have an embossed or otherwise structured surface. The cover layer can also have a pattern formed by structure and/or color, lettering, a decoration or the like. It is further possible to provide various regions of the cover layer with different degrees of transparency; it can be partially opaque and partially transparent or translucent, with the transparency ranging from nearly 100% to a just few percent, e.g., when only punctiform perforation in an otherwise opaque cover layer is provided. The invention is not limited to a particular degree of transparency.

In contrast to the diagram of FIG. 1, it is also possible for the carrier component 12 and the cover layer 14 to be produced in a single process step by foaming-in the cover material, for example, by means of the in-mold-grain or negative-vacuum molding process. In general, the cover layer 14 will cover the front side of the interior trim component 12 and will cover the side edges thereof far enough that the outer edges of the cover layer 14 are not visible when the interior trim component is installed in the motor vehicle.

The light-emitting layer 16, which in the exemplary embodiment shown is a woven fabric containing optical fibers, e.g., a woven fabric made of PMMA fibers, is applied to the back side or B-side of the carrier component 12. Such woven fabrics can be designed such that they emit light on both surfaces or on only one surface, they can be woven with an opaque, e.g., black back side, and they can have structures and patterns woven in, with regions having different light emitting intensity. Examples of suitable woven fabrics may be obtained, for example, from ITP GmbH—Gesellschaft für intelligente textile Produkte, Chemnitz, DE, or from Brochier Technologies, Villeurbanne, FR, which distributes a woven fabric under the name Lightex®.

As indicated in FIG. 1, the fibers of the light-conducting woven fabric are joined at an edge of the light-emitting layer 16, forming connector ends 22 to which a controlled light source can be connected, which is provided by the control module 20.

The shape of the light-emitting layer 16 is matched to the shape of the carrier component 12, wherein said layer is positioned on the back side of the carrier component 12, however, it is not absolutely essential that each individual contour, raised area, depression, etc. on the back side of the carrier component 12 be followed precisely. Instead, the light-emitting layer 16 can span the back side of the carrier component 12 loosely. Where openings are provided in the carrier component 12, the light-emitting layer 16 does not need to have a cutout which is matched precisely to the opening; instead, it is possible to open up the woven fabric of the light-emitting layer 16 in the longitudinal direction in this region, without thereby cutting through the optical fibers, so that the optical fibers are routed around the opening. In this manner, the emission of light through the opening is not interrupted and can instead be conducted behind the opening, as viewed from the connector ends 22.

Thus the light-emitting layer 16, as described, is positioned on the back side of the carrier component 12, but is not required to correspond to the shape thereof in every detail. For example, it is not necessary for the light-emitting layer 16 to have the precise cutouts that are shown in the exemplary embodiment of FIG. 1 at the lower edge of the carrier component. This also prevents corresponding interruptions of the optical fibers and therefore an interruption of the emission of light in the back area of the light-emitting layer 16, as viewed from the connector ends. Furthermore, it is possible for the light-emitting layer 16 to be produced not as a blank cutout, but as a finished woven component having nearly any desired shape, wherein this can be implemented such that the optical fibers of this woven piece extend from the connector ends 22 up to the opposite end of the light-emitting layer 16 without interruption.

The interior trim component 10 is capped off by the base layer 18, wherein in the embodiment shown, the light-emitting layer 16 is first applied, e.g., glued, to the base layer 18. In the exemplary embodiment shown, the base layer has connector pins 24 for connection with the connector ends 22, which are embodied, for example, in the form of plug-in contacts. Moreover, the shape of the base layer 18 corresponds substantially to that of the light-emitting layer 16, and the two layers 18, 16 can be glued to one another or attached to one another by some other method.

The base layer 18 is generally opaque and is made of one of the above-stated materials. Whereas the light-emitting layer can be made of a woven fabric or a film or the like and is not required to be intrinsically rigid, the base layer can be made of a relatively rigid material having at least a certain intrinsic rigidity.

In the embodiment shown, the control module 20 comprises three light sources 26 with the dedicated electronic control system, with said light sources being connected to the light-emitting layer 16 via the connectors 24 and the connector pins 22. The light sources 26 are connected via a flexible circuit board or a ribbon cable 26 to a power source and a control wire, which are not shown here in detail. The light sources 26 can have connecting sockets for receiving the connector pins 24. The light emitted by the light sources 26 is supplied to the connector ends 22 of the light-emitting layer 16 and therefore to the optical fibers thereof.

Figure 2:
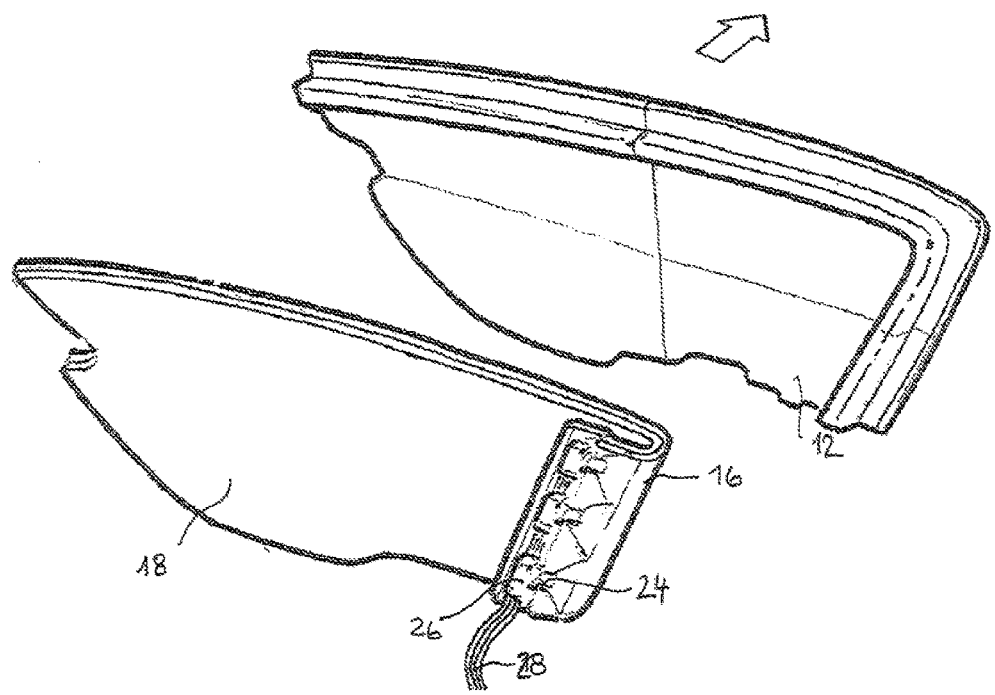
FIG. 2 shows a perspective view of the interior trim component of FIG. 1 in a partially assembled state.
Figure 3:
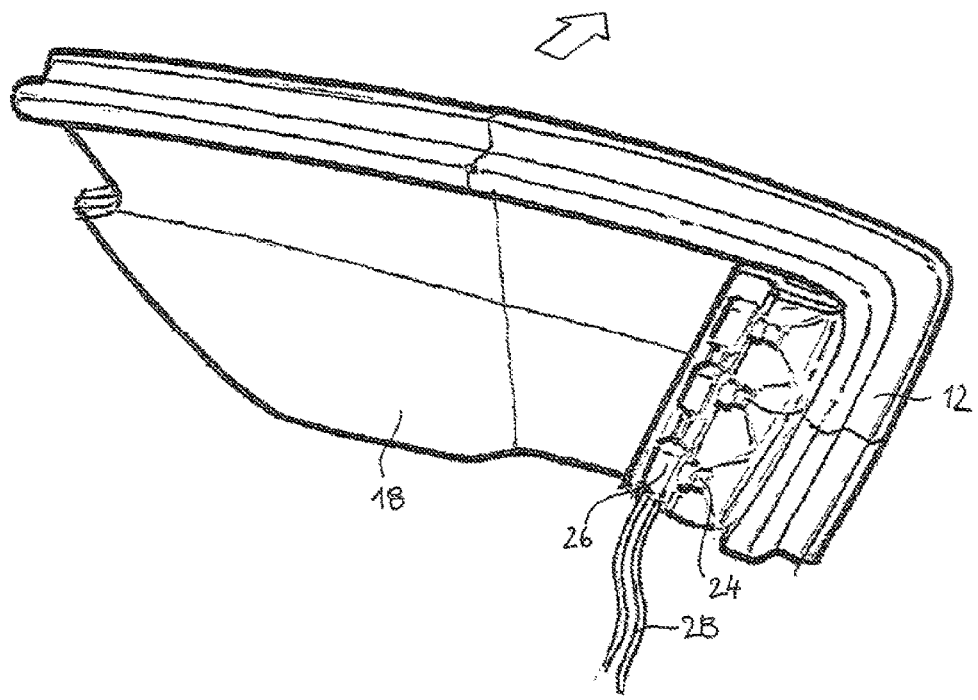
FIG. 3 shows a perspective view of the interior trim component of FIG. 1 in the assembled state.

FIG. 2 shows the interior trim component of FIG. 1 in a partially assembled state, and FIG. 3 shows the fully assembled interior trim component 10, with the arrow pointing in the direction of the passenger compartment of the motor vehicle. Components corresponding to those of the preceding figures are identified by the same reference signs and will not be described again in detail.

In one embodiment of the invention, the composite of carrier component 12 and cover layer 14 is first produced. This composite can be produced by conventional laminating processes, using heat and pressure, by gluing, etc., but also by foaming-in the cover layer with a plastic and/or foam material. In producing the composite of carrier component 12 and cover layer 14, it is not necessary to adjust the production method specifically to the lighting unit, since this unit will not be attached to the composite until a subsequent step.

Base layer 18 and light-emitting layer 16 are glued to one another or attached to one another by some other method, for example, and in the example described here the control module 20 is connected to the connector pins 24, as illustrated in FIG. 2. The preassembled unit of base layer 18, light-emitting layer 16 and control module 20 is then attached to the composite of carrier component 12 and cover layer 14. In the preferred embodiment, the connection between base layer/light-emitting layer 18/16 and the carrier component 12 and cover layer 14 composite is detachable.

For example, said connection can be implemented by means of a latching connection, using fastening clips, or using a removable adhesive. However, the stated components can also be permanently glued, for example, by means of an adhesive tape or film, hot glue, hot caulking, ultrasound or vibrational welding, riveting, etc.

The detachable connection between base layer/light-emitting layer 18/16 and the carrier component 12 and cover layer 14 composite has the advantage that the light-emitting layer 16 can be maintained, removed and replaced.

Figure 2A:
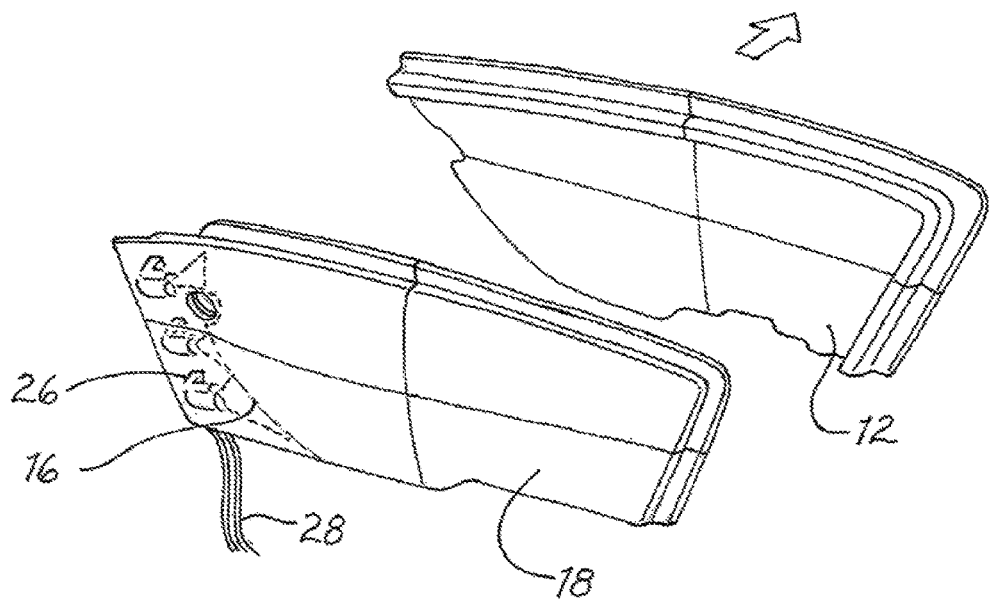
FIG. 2A shows a perspective view of an alternative embodiment of the interior trim component of FIG. 1 in a partially assembled state.

FIG. 2A shows a perspective view of an alternative embodiment of the interior trim component of FIG. 1 in a partially assembled state. FIG. 2A shows the carrier component 12 and the base layer 18, the light-emitting layer 16 being positioned between the carrier component 12 and base layer 18. In this alternative embodiment, the light sources 26, which are coupled to the light-emitting layer 16, and the dedicated electronic system are positioned on the A-side of the base layer 18, i.e. on the side facing the carrier component 12. Light sources and electronic system are therefore protected between the carrier component 12 and the base layer 18. In the exemplary embodiment shown, an LED assembly is used as light source 26.

Figure 2B:
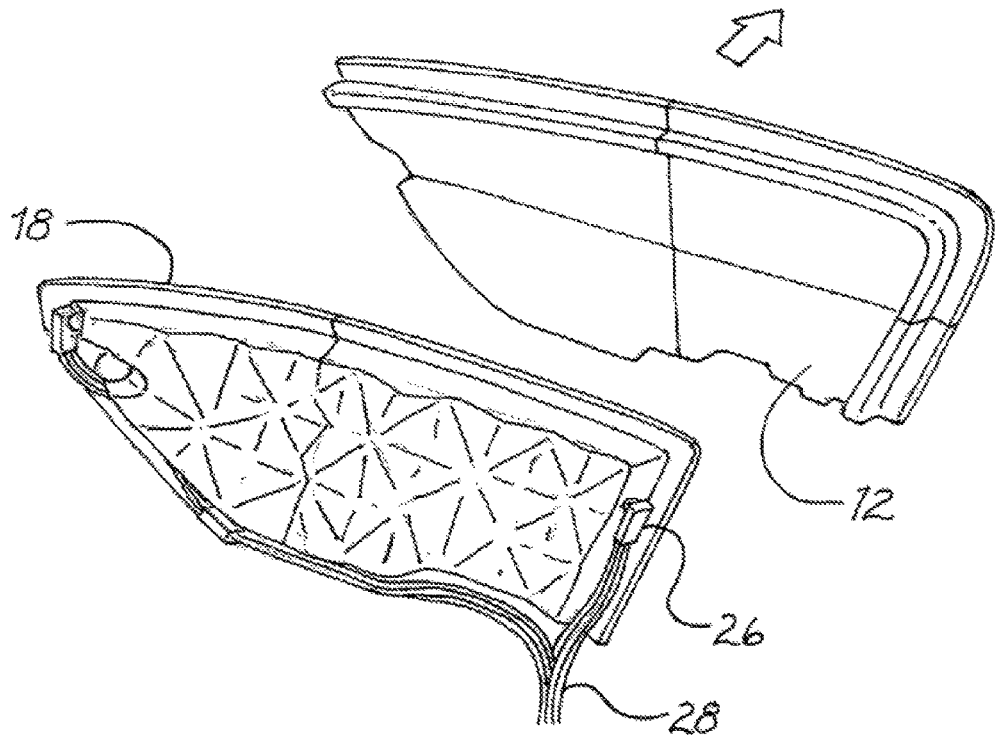
FIG. 2B shows a perspective view of another embodiment of the interior trim component of FIG. 1 in a partially assembled state.

FIG. 2B shows a perspective view of another alternative to the embodiment of the interior trim component of FIG. 1 in a partially assembled state. In this embodiment, the light-emitting layer is formed by a reflector film 44 on the A-side of the base layer 18, which is also shown in the sectional illustration of FIG. 5C. The reflector film or reflector layer 44 has both light-conducting and reflecting properties and absorbs light from the light source 26 in order to distribute and emit this light via the surface of the base layer 18. To achieve the most uniform and low-loss emission of light, the reflector layer 44 and the base layer 18 can be formed, e.g., by creating a bevel structure in the reflector layer 44. For example, the reflector layer can be embodied as a retroreflector, which emits the incident radiation primarily in the direction of the front side of the reflector layer 44, substantially independently of the orientation of the reflector. The exact shape of the reflector layer 44 can be empirically determined using CAD processing in order to optimize the reflective surface and ensure that the light is directed and reflected in the desired direction. The objective is to distribute and radiate the light that is given off by a minimized number individual light sources, e.g., LEDs, across the surface of the reflector layer as uniformly as possible. The surface of the reflector layer 44, or also that of the light-emitting layer 16, can additionally be treated, for example by laser etching, casting, applying further optically effective layers such as a directional film, etc.

Figure 4:
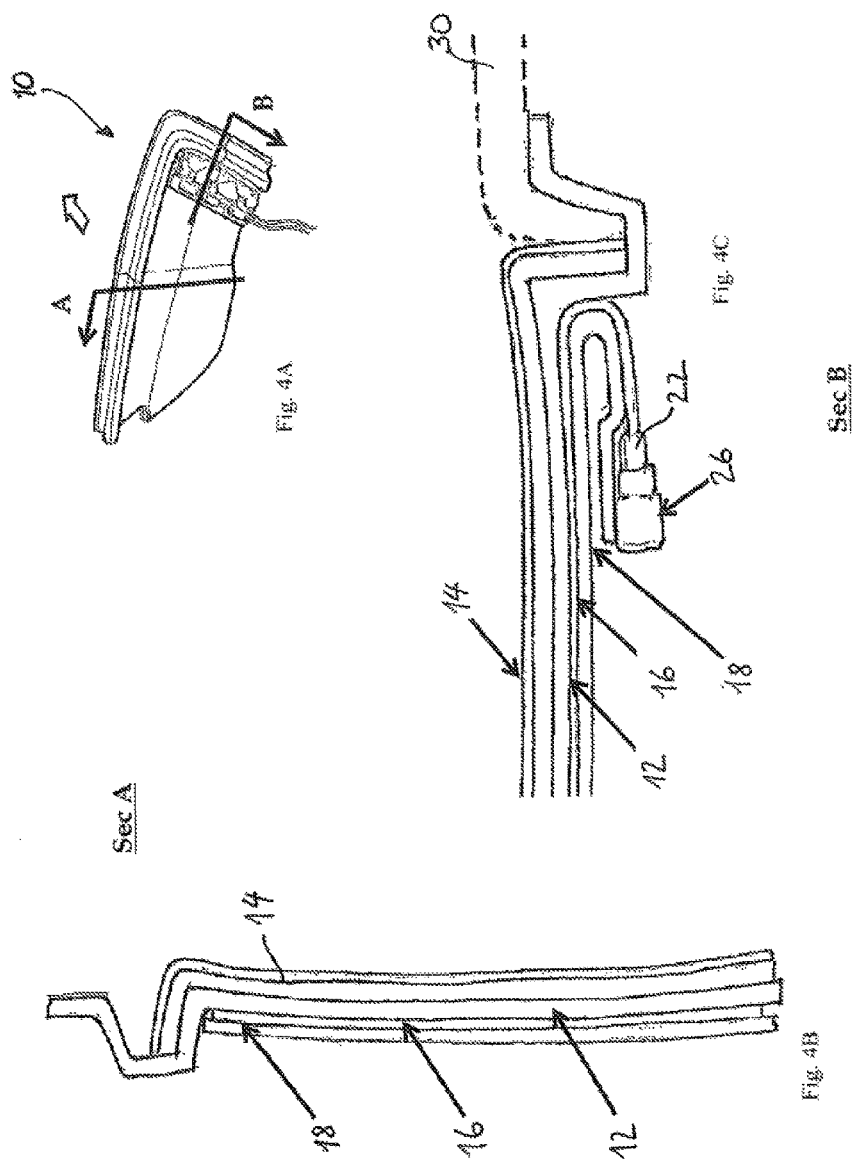
FIG. 4A shows the interior trim component of FIG. 3, in which intersecting lines A and B are indicated.
FIGS. 4B and 4C show sectional illustrations of the component of FIG. 4A along lines A and B.

In the sectional illustrations of FIGS. 4B and 4C, the above-described elements of the interior trim component are again shown in detail, wherein the above statements relating to materials and connection methods apply. In the sectional illustration of FIG. 4C, the connection of the light source 26 to the light-emitting layer 16 via connector end 22 is clear. The connection between light sources and light-emitting layer may be made with or without interconnection of the base layer 18 and any connections formed on the base layer. In the sectional illustration of FIG. 4C, an adjoining interior trim component 30 is further indicated by dashed lines.

Figure 5:
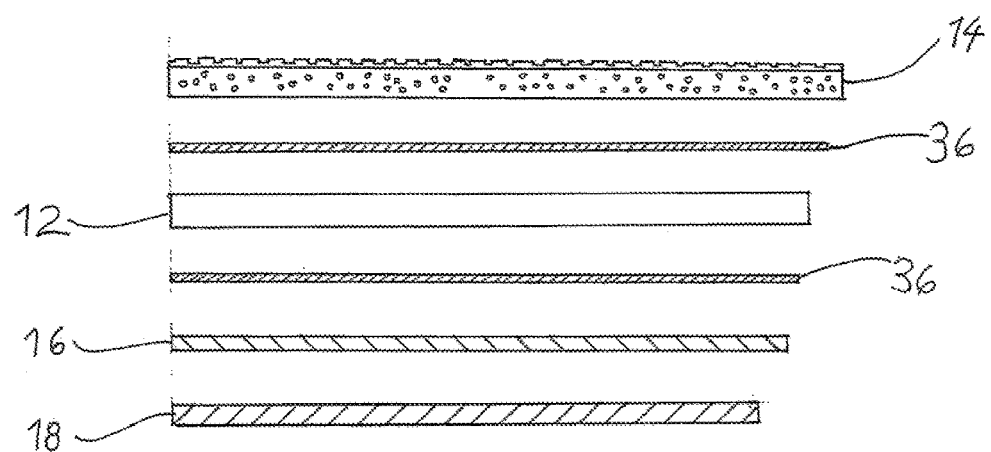
FIGS. 5, 5A and 5B show sectional illustrations of alternative embodiments of the interior trim component showing an exploded view.

FIG. 5 shows an exploded, sectional illustration of a further possible construction of one example of the interior trim component. The interior trim component comprises the carrier component 12, the cover layer 14, the light-emitting layer 16 and the base layer 18, which can in principle be constructed as described above. In the example shown, the cover layer 14 comprises an embossed leather, synthetic leather or Alcantara material, which is foamed in. The transparency of the leather layer can be achieved, for example, by perforation or by a localized thinning of the material, wherein the foam layer is also transparent. The carrier layer 12 may be made of one of the above-described materials, e.g., a transparent PC-ABS material. The light-emitting layer 16 consists, e.g., of a woven optical fiber PMMA material, and the optional base layer 18 may be made of metal, fibers, cardboard, etc. In the example shown in FIG. 5, the cover layer 14 and the light-emitting layer 16 are applied by means of an adhesive layer 36 to the two sides of the carrier component 12. The adhesive layer 36 can comprise hot glue, adhesive, adhesive tape, adhesive film or the like, for example. The adhesion can be permanent or detachable, wherein permanent adhesion can be provided between the cover layer 14 and the carrier layer 12, for example, and detachable adhesion can be provided between the carrier layer 12 and the light-emitting layer 16.

Figure 5A:
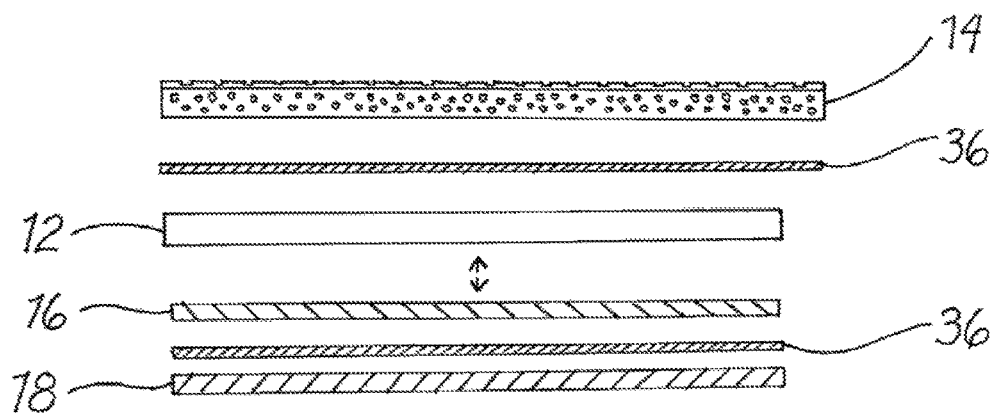

FIG. 5A shows a sectional illustration of the interior trim component according to one alternative to the embodiment of FIG. 5, showing an exploded view. In this alternative, another adhesive layer is provided, on the one hand, between the base layer 18 and the light-emitting layer 16 in order to detachably or permanently connect these to one another. On the other hand, a gap (indicated by the double arrow) is formed between the carrier component 12 and the light-emitting layer 16, wherein the adhesive layer 36 is omitted in FIG. 5. This gap allows the overall optical properties of the trim component to be adjusted further. Spacers can be provided in suitable locations between the carrier component 12 and the light-emitting layer 16.

Figure 5B:
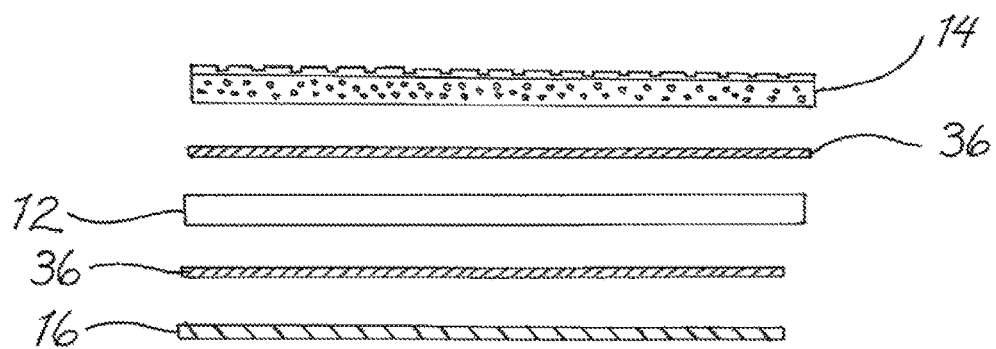

Another alternative of the construction of the interior trim component is illustrated in FIG. 5B, wherein this construction substantially corresponds to the illustration of FIG. 5, with the exception that the base layer 18 is missing.

Figure 5C:
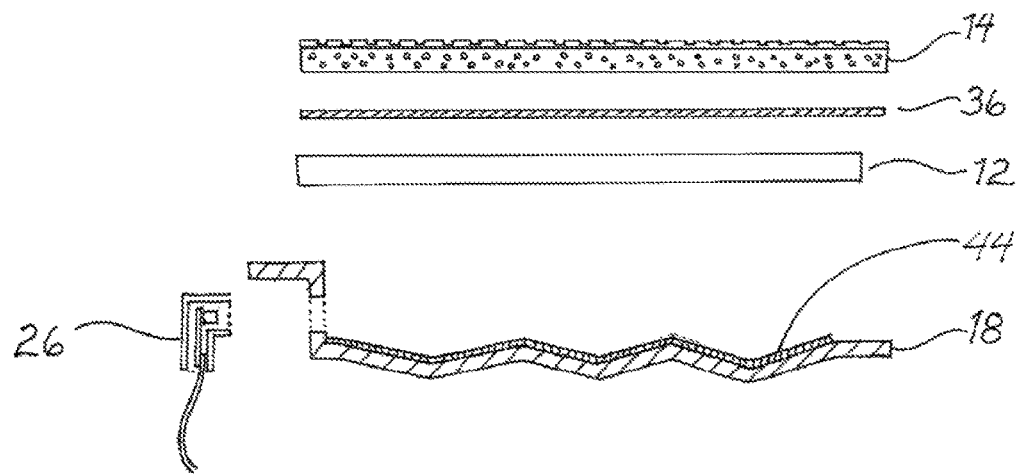
FIG. 5C shows a sectional illustration of another variant of the interior trim component showing an exploded view.

FIG. 5C shows an exploded sectional illustration of another variant of the interior trim component, which can be used in the embodiment of FIG. 2B, for example. In the embodiment of FIG. 5C, a reflector layer 44 is provided in place of the light-emitting layer, and the reflector layer 44 and the base layer 18 are structured in order to optimize the reflection properties. As described above, e.g., the reflector layer 44 and the base layer 18 can be embodied as a retroreflector comprising bevels. Shape and surface of the reflector layer 44 can be empirically optimized to achieve optimization for requirements in terms of light conductivity, reflection and projection of the light. As is also illustrated in FIG. 5C, a light source 26 can be guided through the base layer 18 in order to couple light into the reflector layer 44.

Figure 5D:
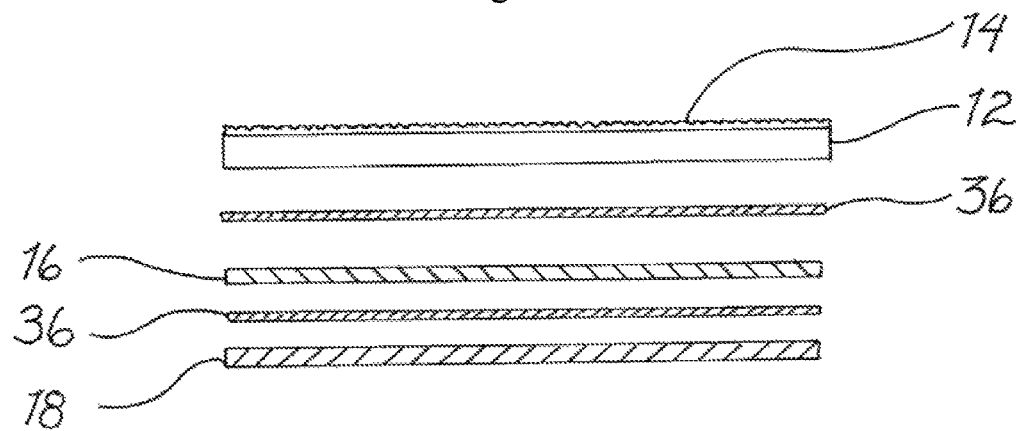
FIG. 5D shows a sectional illustration of another variant of the interior trim component showing an exploded view.

FIG. 5D shows a sectional illustration of another variant of the interior trim component showing an exploded view. In this embodiment, the interior trim component comprises a carrier component 12, which is applied directly to a cover layer 14 embodied as a so-called SmartFoil™. SmartFoil™ is a cover material developed by the applicant and made of a thin back-molded film, e.g., made of TPU, PVC, TPO or TPE. The non-back-molded film has a thickness of less than 1 mm, preferably less than 0.8 mm. To produce the cover layer 14, this film is placed in a mold in a flat shape and back-molded in the mold. This gives the film its final shape and the film can optionally be provided with an embossing or some other surface structure in the mold. As a re-suit of the back-molding, the cover layer has a soft feel. The cover layer 14 is attached to the carrier component 12, wherein the light-emitting layer 16 and the optional base layer 18 are attached to the carrier component 12 using the above-described adhesive layers 36, for example. As in the preceding embodiments, the cover layer 14 and the carrier component 12 are made of a transparent or semitransparent, e.g., frosted, polymer material, wherein a mixture of ABS/PC or PC, e.g., PP, ABS, can be used for the carrier component. Optional embossing of the cover layer can be done both in the mold or in a pre-processing step.

Figure 6:
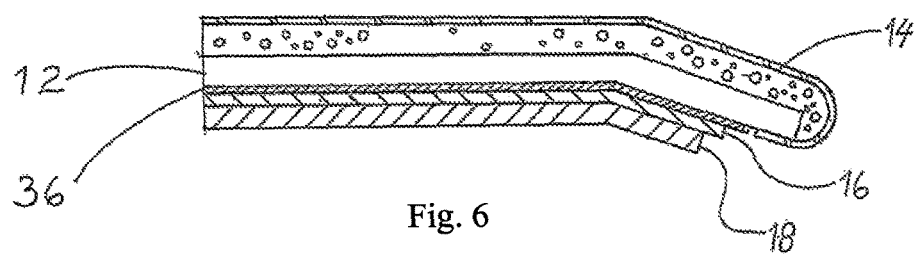
FIGS. 6 and 7 show sectional illustrations of alternative embodiments of the interior trim component.

FIG. 6 shows a sectional illustration of an additional exemplary embodiment of the interior trim component, wherein components corresponding to those of FIG. 5 are identified using the same reference signs.

In the exemplary embodiment of FIG. 6, the interior trim component is shown in the assembled state. In this example, the cover layer 14 is made of a foamed-in slush skin. The composite of carrier component 12 and cover layer 14 can be formed, e.g., by placing the carrier component 12 and the slush skin of the cover layer 14 in a mold and foaming-in the space between carrier component 14 and slush skin in order to produce a composite of carrier component 12 and cover layer 14, without requiring a laminating process, an adhesive layer or the like. The cover layer 14 can be routed around an edge of the carrier component 12. Base layer 18 and light-emitting layer 16 are attached via an adhesive layer 36 to the carrier component 12, similarly to the embodiment of FIG. 5.

Figure 7:
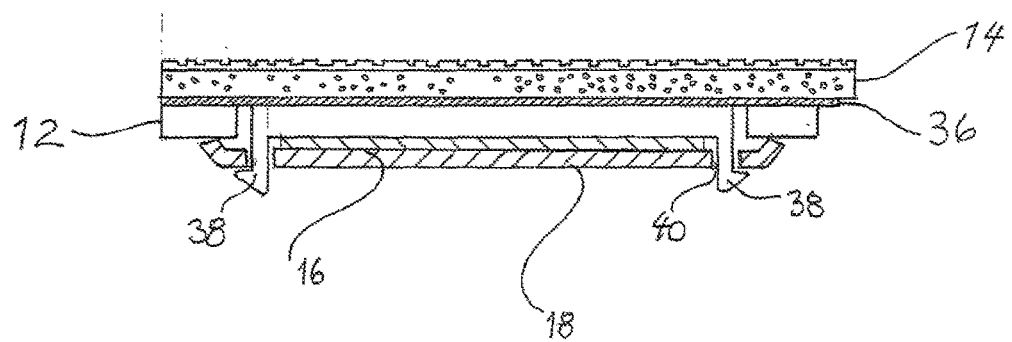

FIG. 7 shows a sectional illustration of yet another variant of the interior trim component, in which the composite of carrier component 12 and cover layer 14 has the same structure, in principle, as in FIG. 5, and is produced using an adhesive layer 36. In this exemplary embodiment, latching hooks 38 are formed on the carrier component 12 and engage through corresponding openings 40 in the base layer 18. The latching hooks 38 can be made of the same material as the carrier component 12, and can be formed directly thereon during the production of the carrier component 12. They are to be flexibly deformable, so that the composite of base layer 18 and light-emitting layer 16 can be easily positioned on the back side of the carrier layer 12 and removed therefrom. Rather than latching hooks, a detachable connection by means of clamps, clips or the like can also be provided.

Figure 8A:
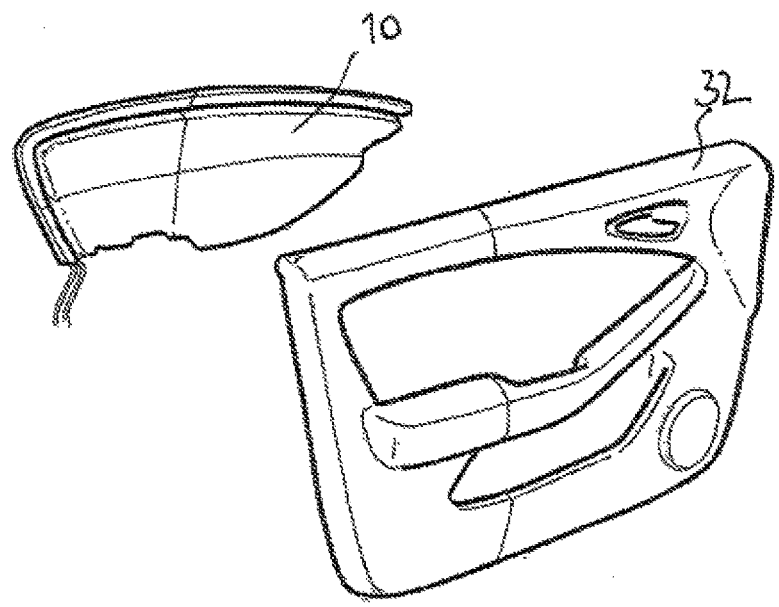
FIG. 8A shows an interior trim component for use in a door trim panel.
Figure 8B:
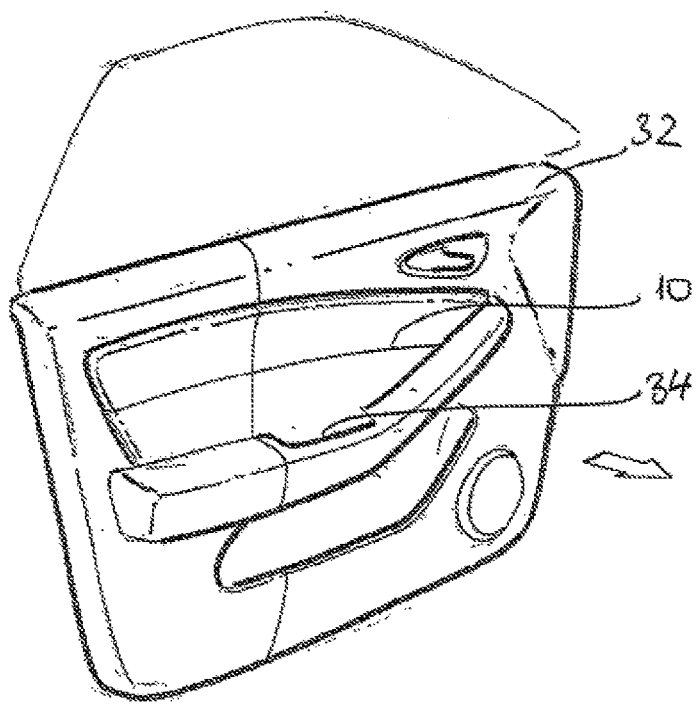
FIG. 8B shows the door trim panel of FIG. 8A with the interior trim component installed.

The diagrams of FIGS. 8A and 8B show how the interior trim component 10 shown in FIGS. 1 to 4 is used in a door trim panel 32. The design of the interior trim component 10 according to the invention allows said trim component to be illuminated uniformly over its entire surface, thereby providing background lighting for the door trim panel 32 and targeted illumination of the handle region 34.

As described here, the invention is not limited to inserts or door trim panels. The light-emitting layer can also be applied to other interior trim regions, such as armrests, columns, storage compartments and pockets, closure panels, parts of the instrument panel, glove compartments, center consoles, thresholds, seats, etc., wherein the invention can be applied to inserts on these parts or to the parts as a whole.

Figure 9:
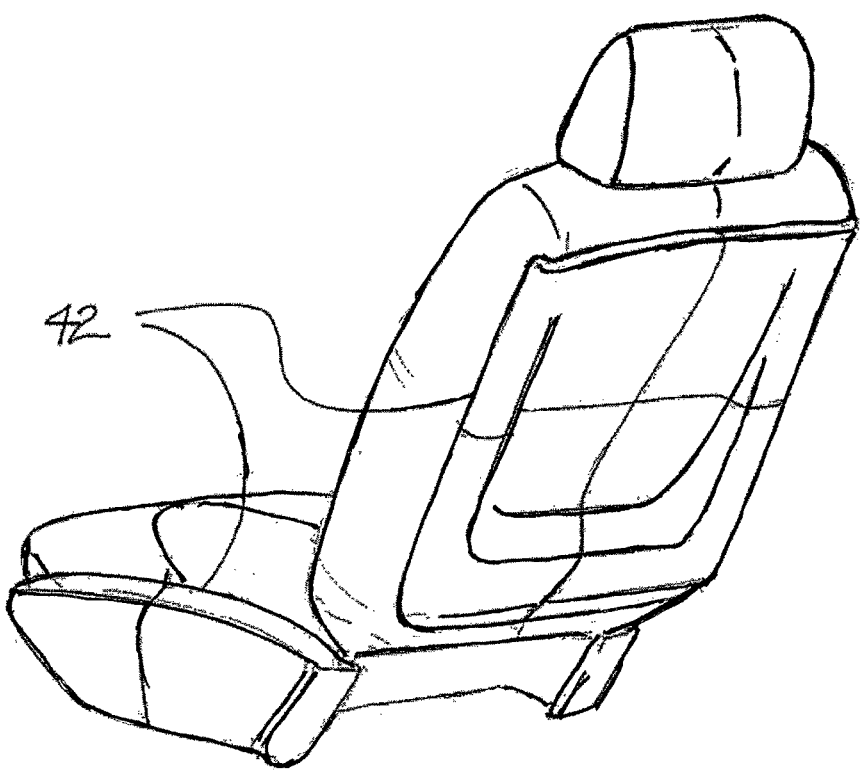
FIG. 9 shows a vehicle seat having two inserts, which represent alternative embodiments of the interior trim component.

FIG. 9 shows a perspective view of another possible application of the interior trim component, wherein in this example, two illuminated inserts 42 are provided, which are applied to the seat back and to the side of a vehicle seat in order to provide background lighting. In principle, the inserts 42 can be structured as described above.

Figure 10:
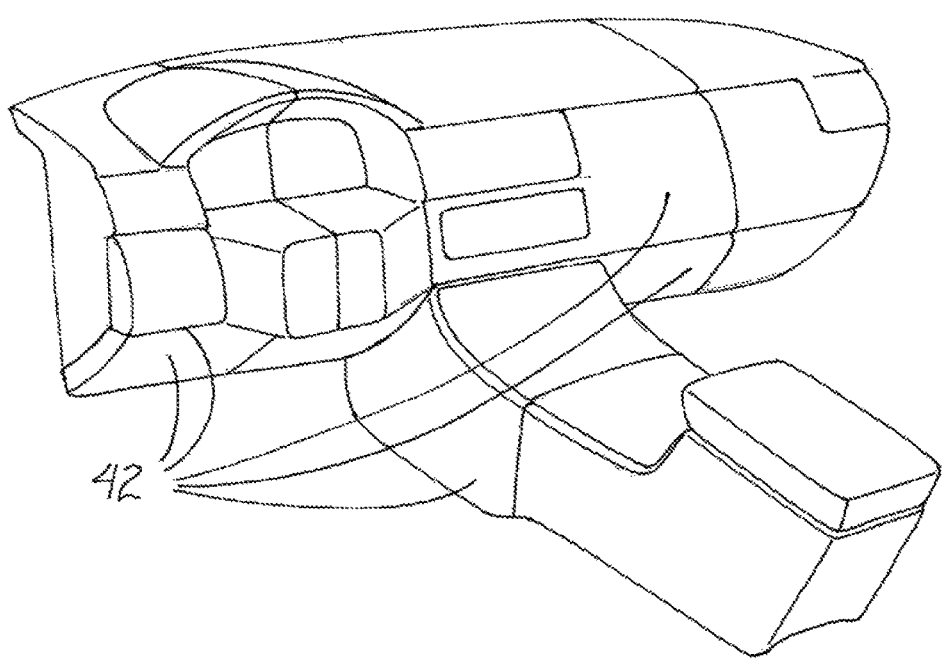
FIG. 10 shows an instrument panel and a center console having inserts, which can be embodied according to the invention.

In embodiments of the invention, the interior trim component is an insert, wherein the light-emitting layer is applied in a last working step once the composite of carrier component and cover layer has been produced. FIG. 10 shows an instrument panel and a center console comprising inserts, which can be embodied in accordance with the invention. As is shown in FIG. 10, the interior trim components can be, for example, part of a center console, an instrument panel, a glove compartment, an airbag cover, just to name a few examples.

Prior to final assembly, the insert can be tested, and the light-emitting layer can preferably be detachably and replaceably attached to the insert. In this manner, the interior trim component can be maintained, and waste is avoided during production. The carrier component can also be made of a conventional, cost-effective material. However, the invention is not limited to inserts and can also comprise other and larger trim units.

The interior trim component of the invention is superior to illuminated interior trim components of the prior art in that the light distribution is substantially more uniform and the formation of hotspots is avoided. The carrier component serves as a diffuser, so that even ribs, raised areas, beads, edges, etc. do not impede the uniform emission of light. It is even possible to route the light-emitting layer around recesses and cutouts in the carrier component, without interrupting the emission of light. Finally, the light-emitting layer is better protected against damage and wear due to its positioning behind the carrier component.

LIST OF REFERENCE SIGNS

10 Interior trim component
12 Carrier component
14 Cover layer
16 Light-emitting layer
18 Base layer
20 Control module
22 Connector ends
24 Connector pins
26 Light sources
28 Flexible circuit board or ribbon cable
30 Adjoining interior trim component
32 Door trim panel
34 Handle region
36 Adhesive layer
38 Latch hooks
40 Openings
42 Inserts
44 Reflector layer

What is claimed is:

1. An interior trim component for a motor vehicle, which comprises:
    a carrier component, which determines an outer contour of the interior trim component,
    a cover layer, which is applied to a front side of the carrier component,
    a light-emitting layer, which is applied to a back side of the carrier component, said light emitting layer having at least one plug-in connector end portion configured to receive light from a light source of said vehicle,
        wherein the carrier component and the cover layer allow light to pass through, and
        wherein the interior trim component has a supporting structure and the carrier component is the supporting structure of the interior trim component.

2. The interior trim component according to claim 1, wherein the cover layer is permanently attached to the carrier component and the light-emitting layer is detachably attached to the carrier component.

3. The interior trim component according to claim 1, wherein the light-emitting layer is coupled to the carrier component via a latch-, snap- or screw connection.

4. The interior trim component according to claim 1, wherein the light-emitting layer is applied to a base layer.

5. The interior trim component according to claim 4, wherein the base layer includes connectors to connect to said plug-in connector of said light emitting layer.

6. The interior trim component according to claim 4, wherein the base layer is opaque.

7. The interior trim component according to claim 1, wherein the light-emitting layer comprises at least one of a woven fabric containing light-conducting fibers, a light-conducting film, a light-conducting plate, an electroluminescent film, and a film or a foil with at least one integrated or printed LED wherein the foil is at least one of electrically conducting and light-conducting.

8. The interior trim component according to claim 7, wherein the woven fabric containing light-conducting fibers comprises PMMA fibers.

9. The interior trim component according to claim 7, wherein the woven fabric containing the light-conducting fibers has a woven structure and/or an opaque back side.

10. The interior trim component according to claim 1, wherein the light-emitting layer is a woven fabric containing light-conducting fibers and the woven fabric is opened up in the region of an opening in the interior trim component such that the light-conducting fibers are routed around the opening without interrupting light conduction.

11. The interior trim component according to claim 1, wherein the carrier component is made of a colored or uncolored plastic, and serves as a diffuser for the light emitted by the light-emitting layer.

12. The interior trim component according to claim 1, which is embodied as an insert for interior trim or as an entire interior trim component, said interior trim component comprising the panel for the inside of a door, an instrument panel, a center console, a column, a roof liner, a seat, an armrest, a storage compartment or a cover thereof.

13. The interior trim component according to claim 1, wherein the light-emitting layer is optically coupled to said light source.

14. The interior trim component according to claim 13, wherein the light source comprises at least one LED.

15. The interior trim component according to claim 1, wherein the carrier component is injection molded.

16. The interior trim component according to claim 1, wherein the carrier component is formed of a rigid plastic material.

17. The interior trim component according to claim 1, wherein the carrier component is formed of at least one of ABS, PC, PC-ABS, PMMA, PU, PET and PP.

18. The interior trim component according to claim 1, wherein the carrier component is self-supporting.

19. The interior trim component according to claim 1, wherein the at least one connector comprises at least one connector pin.

20. The interior trim panel component according to claim 1 wherein the cover layer comprises a decorative layer.

21. The interior trim panel component of according to claim 1 wherein the light-emitting layer comprises woven fabric containing regions having different light emitting intensity.

22. The interior trim panel component according to claim 1 wherein the carrier component is rigid.

23. The interior trim panel component according to claim 1 wherein the carrier component is semi-rigid.

24. The interior trim panel component according to claim 1 wherein the carrier component is formed by injection molding, vacuum molding, back molding, compression molding, casting or 3-D printing.

25. A method for producing an interior trim component for a vehicle which comprises:
producing a composite composed of a carrier component and a cover layer, wherein the cover layer is permanently applied to the front side of the carrier component,
attaching the light-emitting layer to the back side of the carrier component of the composite, wherein the attachment is detachable, said light emitting layer having at least one plug-in connector end portion configured to receive light from a light source of said vehicle, wherein the carrier component and the cover layer allow light to pass through, and
wherein the interior trim component has a supporting structure and the carrier component is the supporting structure of the interior trim component.

* * * * *